Nov. 11, 1941.   J. C. CROWLEY   2,262,169
VALVE STEM
Filed Aug. 7, 1936
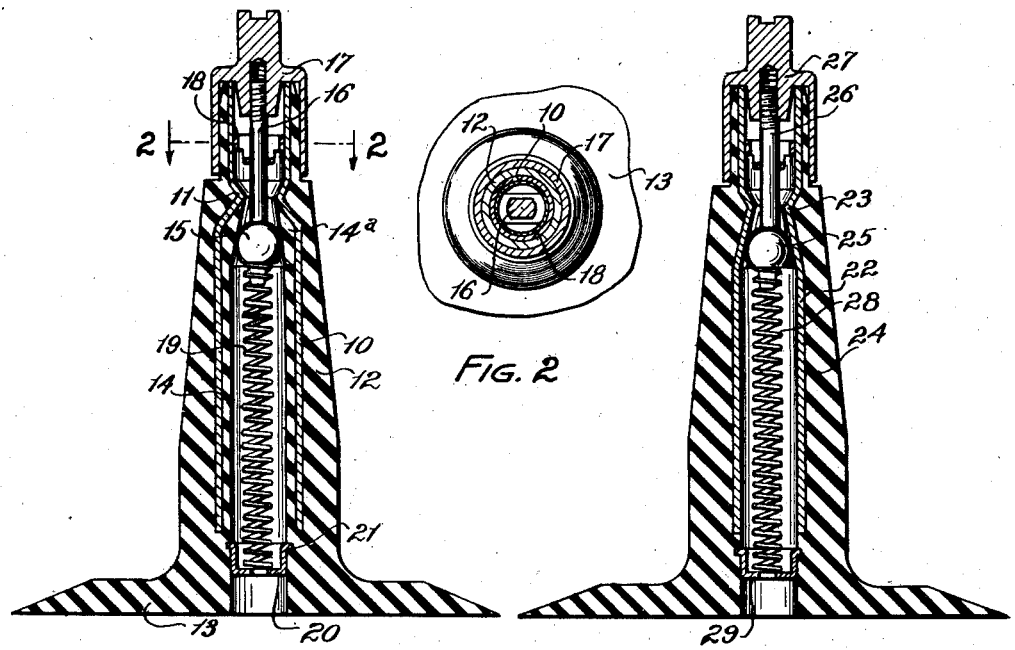
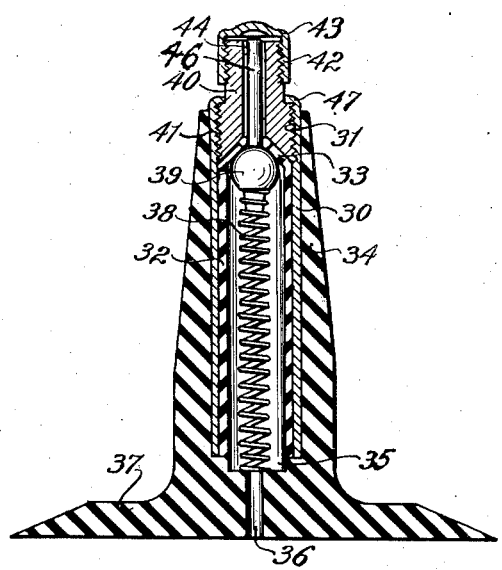
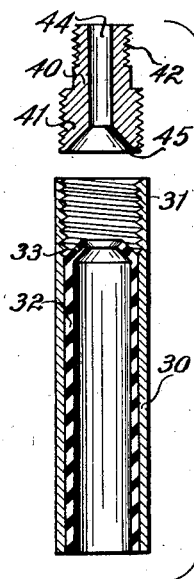
INVENTOR.
JOHN C. CROWLEY
BY Hwis, Hudson & Kent
ATTORNEYS.

Patented Nov. 11, 1941

2,262,169

UNITED STATES PATENT OFFICE 2,262,169

VALVE STEM

John C. Crowley, Cleveland Heights, Ohio, assignor to The Dill Manufacturing Company, Cleveland, Ohio, a corporation of Ohio Application August 7, 1936, Serial No. 94,765

1 Claim. (Cl. 251—121)

This invention relates to a valve stem for use with pneumatic tires and other inflatable articles, and particularly to a rubber valve stem.

An object of the invention is to provide a rubber valve stem for pneumatic tires or other inflatable articles which may be vulcanized to the tire or article and will have the usual advantages of a rubber valve stem but at the same time will be so formed as not to balloon or bulge under air pressures.

Another object is to provide a rubber valve stem wherein the usual valve insides or core does not need to be employed since the seat for the valve is formed by a portion of the stem itself.

Another object is to provide a rubber valve stem of the character above specified wherein the valve seat that is structurally part of the stem is of sufficient rigidity or is so reenforced that the air pressures will not cause the valve to distend the seat so that the valve blows out of the stem.

Another object is to provide a rubber valve stem which is simple in construction, efficient in operation, and which can be readily manufactured and the valve assembled therein.

Further and additional objects and advantages not hereinbefore specified will become apparent hereinafter during the detailed description of several embodiments of the invention which are illustrated in the accompanying drawing wherein Fig. 1 is a sectional view on an enlarged scale through one form of the valve stem;

Fig. 2 is a sectional view taken substantially on line 2—2 of Fig. 1 looking in the direction of the arrows;

Fig. 3 is a sectional view on an enlarged scale through another form of valve stem embodying the invention;

Fig. 4 is a sectional view on an enlarged scale through a still different form of the valve stem embodying the invention; and Fig. 5 is a sectional view showing certain of the elements of the stem of Fig. 4 arranged in separated relationship.

The stem shown in Figs. 1 and 2 comprises a reenforcing member 10 formed preferably of relatively thin gauged metal or other suitable material and being of cylindrical form and deformed near but inwardly of one end thereof to provide an inwardly extending annular V-shaped depression 11 forming a restricted passage in the member. The internal diameter of the reenforcing member on the longer side of the V-shaped depression is greater than the internal diameter of the member on the shorter side thereof. The reenforcing member is molded in the rubber stem 12 and extends from the outer end of the stem to adjacent the base 13 thereof. It will be noted that in molding the stem around the reenforcing member a portion 14 of the stem is located within the reenforcing member from the V-shaped depression thereof to the inner end of the member, it being noted that adjacent the V-shaped depression 11 the portion 14 of the rubber stem is slightly thickened and formed with a taper, as indicated at 14a, said portion 14a constituting the valve seat within the stem. The rubber stem is not molded interiorly of the reenforcing member from the V-shaped depression 11 to the outer end of the member, but only upon the outer surface of this portion of the member and of reduced thickness so that a valve cap, later to be referred to, can be positioned upon the end of the stem. A valve 15 is mounted in the stem and is adapted to seat on the tapered portion 14a thereof that is located within the reenforcing member. This valve has connected therewith a valve pin 16 having its outer end threaded so as to screw into a threaded recess formed in a valve cap 17 that fits upon the reduced outer of the stem. The valve pin 16 is guided in its movements by a suitable guiding member 18 located within the outer portion of the reenforcing member and preferably held therein by its frictional engagement with said member. A valve spring 19 is located within the stem and engages at one end the underside of the valve 15 while its opposite end abuts with a cup-shaped member 20 having an annular flange 21 which preferably is located in a groove formed in the rubber stem.

It will be seen that the valve 15, spring 19, and member 20 can be assembled in the valve stem by passing the valve 15 and valve pin 16 upwardly from the bottom of the stem and then similarly positioning the spring 19 and the member 20, it being understood that the member 20 is of such size as to require a slight spreading of the passageway through the valve stem in order to position it as shown in Fig. 1. When once the member 20 has been positioned it will be held by the resilience of the rubber valve stem.

Although the spring 19 will hold the valve 15 seated against the valve seat formed by the portion 14a of the rubber valve stem, it is proposed to positively draw the valve to its seat by means of the valve cap 17 which, as has been stated, is threadedly connected to the upper end of the valve pin 16. It will be understood that the cap 17 can be rotated to cause the valve 15 to positively move into tight engagement with the valve seat, and due to the fact that the valve seat is reenforced by the member 10, and particularly the V-shaped depression thereof, there will be no danger of the valve being forced through the restricted orifice forming the valve seat within the rubber stem. It will be noted further that the reenforcing member 10, inasmuch as it extends substantially the full length of the valve stem, will prevent any ballooning or bulging of the valve stem due to the air pressures within the passageway through the stem. In view of this fact the valve stem can be made of relatively soft rubber in place of the very hard rubber which would be required were the stem not properly reenforced throughout the major portion of its length.

The valve stem shown in Fig. 3 comprises a reenforcing member 22 similar to the reenforcing member 10 previously described except that the V-shaped depression 23 thereof is relatively shallow and one of the arms of the V is slightly inclined and of relatively long length and forms a valve seat, as will later be explained. The rubber stem 24 is molded about the reenforcing member 22, as in the previously described form, but it should be noted that none of the rubber stem extends interiorly of the reenforcing member. The valve 25 is either of molded rubber or has molded thereon a rubber covering or gasket so that a tight seal is effected when the valve seats against the valve seat formed by the V-shaped depression 23 of the reenforcing member. The pin 26 of the valve is threadedly connected to the valve cap 27, and the rotation of said valve cap in the proper direction causes the valve to move tightly into engagement against its valve seat, as in the form previously described. The valve spring 28 and the spring abutting member 29 correspond with the valve spring 19 and the member 20 previously explained, and these members together with the valve and its pin are assembled in the stem exactly as are the corresponding parts of the previously described form.

In the valve stem shown in Figs. 4 and 5, the reenforcing member is indicated at 30, and prior to its final assembly in the stem is a straight cylindrical member having one end thereof internally threaded as indicated at 31. A rubber lining 32 is molded in the member 30 and extends from the unthreaded end thereof to the inner end of the threaded portion 31 at which point the rubber lining is of conical formation, as indicated at 33. The member 30 with its rubber lining 32 is molded in a rubber valve stem 34 provided with a counterbore of a diameter to receive the member 30, while at the lower end of the counterbore there is a short counterbore 35 which communicates with a small bore 36 that extends from such point through the stem and the base 37 thereof. When the stem 34 has been molded upon the member 30, the valve spring 38 and the valve 39 are passed inwardly of the member 30 from the outer end of the stem and pushed through the conical portion 33 of the rubber lining 32, it being understood that said portion can flex and the opening therein be expanded to allow the insertion of the valve spring and valve. The spring 38 abuts at its lower end the bottom of the counterbore 35 in the stem, while its upper end, of course, abuts the valve 39. When the valve and spring have been thus positioned, a secondary reenforcing member 40 is assembled with the other parts of the stem. The member 40 has an enlarged threaded portion 41 which screws into the threaded portion 31 of the member 30 and a reduced threaded portion 42 upon which a valve cap 43 can be screwed. The member 40 is provided with a bore 44 which terminates at its inner end in a conical enlargement 45. The member 40 is screwed into the member 30 until the conical enlargement 45 of the bore 44 tightly engages the conical portion 33 of the rubber lining 32 in the member 30 and reenforces said portion which then acts as the valve seat which it will be noted is sufficiently stiff to prevent the valve 39 from pushing outwardly through the conical portion 33 of the rubber lining.

The valve pin 46 for depressing the valve from the seat formed by the portion 33 of the rubber lining when it is desired to inflate or deflate the article to which the stem is attached extends upwardly through the bore 44 in the member 40 and its function will be well understood in the art. The member 30 is of such length that when it is mounted in the valve stem the member will extend beyond the outer end of the stem, and thus when the member 40 has been tightly screwed into position to reenforce and back up the valve seat, as has been previously described, the outwardly extending end of the member is bent over into tight engagement with the shoulder formed between the portions 41 and 42 of the member 40, as indicated at 47. When this has taken place it will be seen that the member 40 is locked to the member 30, and inasmuch as the bent over end 47 of the member 30 is brought into very tight engagement with the member 40, said member is held against rotation relative to the member 30.

In all of the forms herein described it will be seen that a rubber valve stem is employed which can be formed of relatively soft rubber and which, due to the reenforcing members in the stem, will not bulge under air pressures. It will also be seen that all of the valve stem are provided with valve seats formed as a structural part of the stem, thus eliminating the use of the usual valve insides or cores, and due to the fact that such valve seats are adequately reenforced or backed up, there will be no danger of the valve expanding the seats under air pressure, or, when positively drawn into engagement with the seats, of passing through the restricted orifices formed by the seats. It will also be noted that in all of the stems provision is made for readily assembling the valve and its spring within the stems.

Although several preferred embodiments of the invention have been illustrated and described herein, it should be understood that the invention is susceptible of various modifications and adaptations within the scope of the appended claim.

Having thus described my invention, I claim:

A rubber valve stem having a tubular reenforcing member extending substantially throughout the length of the stem, said member being provided intermediate its ends with an inwardly extending depression forming a restricted opening therethrough, the rubber stem being molded on said member both exteriorly and interiorly thereof from the restricted depression to the inner end of said member, the portion of the rubber stem within said member being formed with a taper to constitute a valve seat, the restricted depression in said member acting to reenforce said valve seat, and a valve located in said stem and adapted to seat upon said valve seat.

JOHN C. CROWLEY.